Patented Aug. 14, 1951

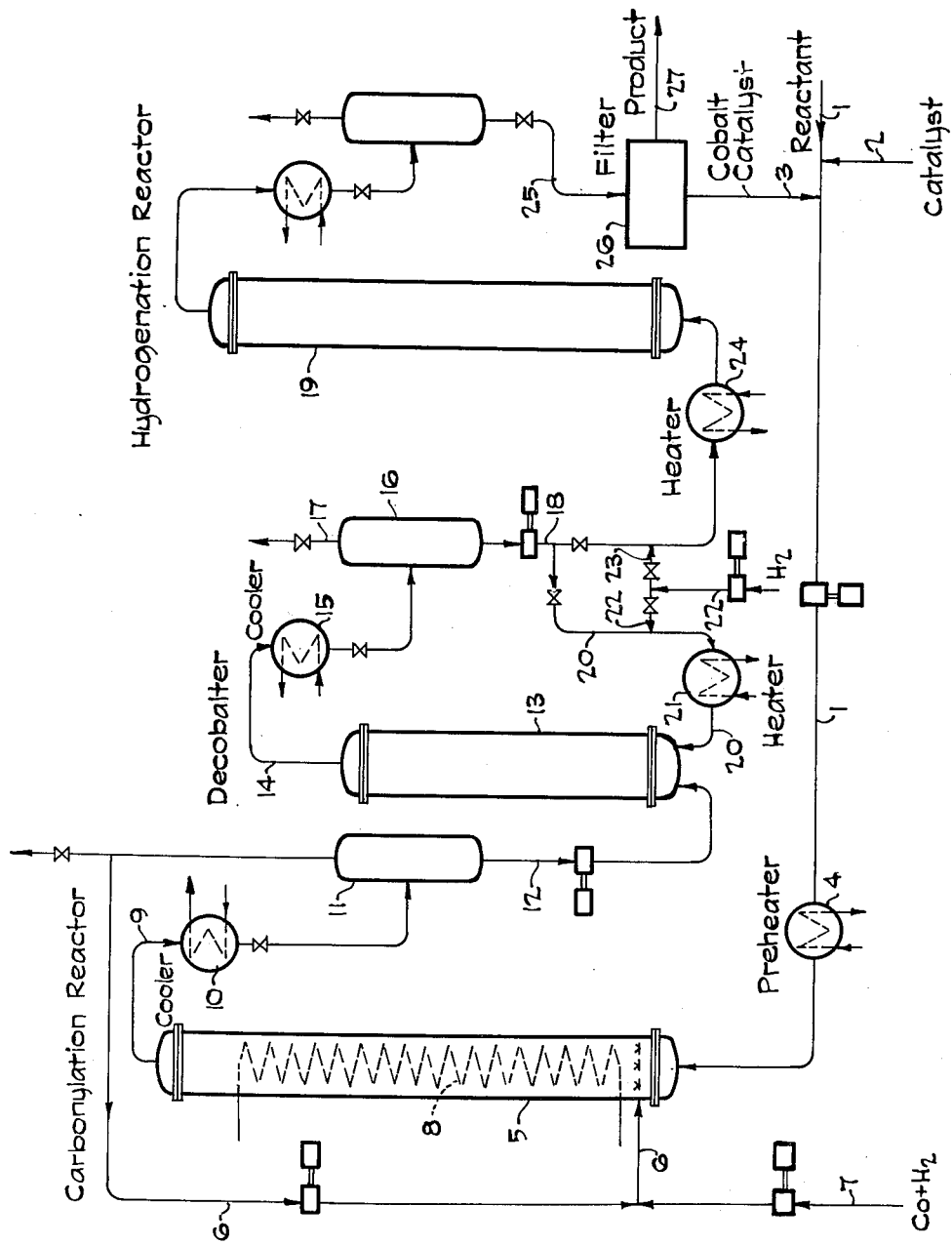

2,564,456

UNITED STATES PATENT OFFICE 2,564,456

SYNTHESIS OF OXYGENATED COMPOUNDS

Johannes C. Vlugter, Aloysius I. M. Keulemans, and Marius 't Hart, Amsterdam, Netherlands, assignors to Shell Development Company, San Francisco, Calif., a corporation of Delaware Application October 21, 1949, Serial No. 122,644
In the Netherlands October 25, 1948

3 Claims. (Cl. 260—604)

This invention relates to an improvement in the synthesis of oxygenated compounds through carbonylation, i. e., the catalyzed addition of carbon monoxide to a parent unsaturated compound, with a cobalt catalyst. More particularly, the invention relates to an improved method for the removal of soluble cobalt from the intermediate product in such a process.

The synthesis of oxygenated compounds through the catalyzed addition of carbon monoxide to various unsaturated parent compounds is now well known. One such synthesis process is commonly referred to as the Oxo process. Various details as to the reactants, catalyst, etc., may be found in the following U. S. patents: No. 2,327,066, No. 2,402,133, No. 2,429,878, No. 2,437,600, No. 2,464,916.

The mechanism of the catalysis is not known. However, it is believed that the active catalyst is some labile cobalt compound which may be produced in the reaction zone from cobalt or one of the cobalt carbonyls which are invariably present under the carbonylation conditions. Since the active catalyst is normally produced in the carbonylation zone from one of these substances, the form of the catalyst supplied makes little difference. Thus, metallic cobalt may be used or a soluble cobalt salt, or one of the cobalt carbonyls. In order to effect the cobalt catalyzed carbonylation, the temperature must be between about 130° C. and 200° C., and is preferably between about 150° C. and 180° C. The partial pressure of carbon monoxide is preferably above 20 atmospheres and preferably in the order of 50 to 200 atmospheres. The ratio of hydrogen to carbon monoxide in the gas is usually between 1:2 and 2:1, e. g., 1.2. In the practical application of the synthesis, it is essential to supply an excess of gas above that consumed in the synthesis and to recycle the unconsumed gas. It is also necessary in the practical application of the process to cool the reaction product issuing from the carbonylation zone to recover the reaction product from the excess gas.

When carrying out the synthesis of an oxygenated compound by carbonylation under the usual conditions, the intermediate aldehydic product from the carbonylation zone is found to contain appreciable amounts of cobalt in solution. This soluble cobalt is largely in the form of a mixture of complex cobalt carbonyl addition compounds of unknown composition. In order to facilitate completion of the synthesis or further working up of the aldehydic product and also to recover the cobalt for reuse, it is necessary to free the reaction mixture of soluble cobalt. This is effected by decomposing the mentioned cobalt carbonyl complexes under suitable conditions in a step referred to as the decobalting step. While various methods, such as treatment with acid, have been tried to effect this decobalting, the usual method is to treat the product hydrogen at a temperature in the order of 180° C. This method is quite effective in converting the soluble cobalt into insoluble cobalt metal which may be then used as the catalyst in a subsequent operation and may be finally recovered from the product by filtration, sedimentation, distillation, or the like. In the practical application of this process, however, serious difficulties are encountered. Upon heating the intermediate reaction mixture containing the soluble cobalt up to the necessary decobalting temperature, insoluble cobalt is formed and deposited on the walls of the container, e. g., preheater, and this results in frequent plugging of the apparatus.

In the method of the present invention the usual preheating step is eliminated and the necessary decobalting temperature is obtained by mixing the product with decobalted product which has been separately heated under controlled conditions to avoid excessive side reactions and loss of activity of the catalyst.

The method of the invention will be explained in further particular in connection with the description of a typical example. To aid in the description, reference will be had to the accompanying drawing wherein a suitable arrangement of apparatus and the more important flows are illustrated diagrammatically. Referring to the drawing, the unsaturated reactant to be carbonylated, in this case diisobutylene, enters via line 1. A small amount of make-up catalyst is added as needed via line 2. This catalyst may consist of cobalt deposited on kieselguhr or it may be a solution of a soluble cobalt compound in diisobutylene. If a kieselguhr base catalyst is used, it is important that a very finely divided kieselguhr freed of quartz particles should be employed in preparing the catalyst. Recycled catalyst is added via line 3 and the resulting slurry is pumped via line 1 and preheater 4 to the carbonylation reactor 5. The material is preheated to a temperature of about 130° C. in the preheater 4. Recycled gas is pumped into the carbonylation reactor via line 6, and make-up gas is introduced into the stream via line 7. The mixture of gases entering the carbonylation reactor consists essentially of 1.2 parts of hydrogen to 1 part of carbon monoxide. The pressure in the carbonylation reactor 5 is maintained at about 225 atmospheres. The carbonylation reaction is quite exothermic. The excess heat is removed by means of a cooling coil 8 to maintain the temperature in the carbonylation reactor between about 150° C. and 180° C. The hot reaction mixture, including the aldehydric reaction product, suspended catalyst, dissolved cobalt and gas and leaving the carbonylation reactor via line 9, is passed to a cooler 10 and then to a separator 11. The unreacted gas is withdrawn from the top of the separator and is recycled as described. The liquid product containing dissolved cobalt and suspended catalyst is withdrawn via line 12 and is passed without any preheating into the decobalting reactor 13. The liquid product free of dissolved cobalt, and the gas, leave the decobalting reactor 13 via line 14 and after cooling in cooler 15 are passed to a separator 16. The gas withdrawn via line 17 may be combined with the gas stream in lines 7 or 6 (not shown) or it may be handled in any desired manner. The decobalted product containing suspended catalyst is withdrawn via line 18 and is split in two ways. Part of the product is passed via line 18 to the hydrogenation reactor 19 and another part is passed via line 20 to a heater 21. Prior to entering the heater, or at the entrance to the heater, hydrogen gas is introduced via line 22. The amount of hydrogen so introduced is sufficient to afford a partial pressure of hydrogen of more than 10 atmospheres, e. g. 25–30 atmospheres, in the heater. The mixture of decobalted product and hydrogen is heated to a temperature between about 200° C. and 350° C., and preferably to a temperature of at least 20° C. above the desired decobalting temperature prevailing in the decobalting reactor 13. The amount of liquid and gas introduced via line 20 is adjusted according to the temperature to maintain a suitable decobalting temperature in the decobalting reactor 13. The decobalting may be effectively carried out at somewhat lower temperatures, down to about 150° C., but the decobalting is slow at these temperatures and consequently a temperature in the order of 170° C. to 190° C. is preferred.

It is known that the aldehydic reaction product from the carbonylation zone is very prone to undergo undesired side reactions, particularly in the presence of the catalyst, and particularly if the product is heated; consequently in the previous practice any heating of the reaction product in the presence of the catalyst has been avoided as far as possible. It is, therefore, surprising to find that the product can be heated to temperatures of 200° C. or above in the presence of the catalyst without any undue side reactions and, in fact, with less side reactions than when the product is preheated in a preheater prior to the decobalting step. It is believed that the success of the present method is due largely to the hitherto unappreciated fact that the soluble cobalt compounds are largely responsible for the observed catalytic effect. If this were not the case, it would appear to be impossible to heat the product to such temperatures in the presence of the catalyst without the formation of undue amounts of polymers and condensation products.

It will be noted that in the described method, the decobalted material is heated in heater 21 in the presence of hydrogen under a partial pressure of more than 10 atmospheres. It is essential that a sufficient partial pressure of hydrogen be maintained during the heating of the decobalted product. It is found that if the partial pressure of hydrogen is not above 10 atmospheres, the catalyst is substantially completely deactivated. Also, the presence of the substantial hydrogen pressure allows the product to be heated to higher temperatures without appreciable decomposition.

The decobalted product is finally mixed with hydrogen from line 23, preheated to about 180° C. in heater 24, and passed to the hydrogenation reactor 19 wherein the synthesis is completed. After cooling the product and separating the gas in the conventional manner, the liquid product containing suspended catalyst is passed via line 25 to a filter 26 or to any other equivalent device for separating the suspended catalyst. The product is withdrawn via line 27 and the catalyst is recycled via line 3, as described.

It will be noted that in the described method of the invention, the reaction mixture containing dissolved cobalt is heated from a temperature below 50° C. to the desired decobalting temperature without contact with any hot wall surface, i. e., without contact with a tube or wall surface having a higher temperature than the liquid. When the desired decobalting temperature is obtained in this manner, no appreciable deposition of cobalt on the confining walls or other parts of the apparatus takes place and the difficulties hitherto encountered are eliminated.

In compliance with the requirements of the patent laws, the preferred embodiment of the method of our invention has been set forth in the above description. To insure complete compliance, it may be added that in the practice of the described method, it has been found desirable to employ a steam heated, oil heated, or Dowtherm heated exchanger for the heater 21, and that whereas it is possible to preheat the stream in line 12 to a very minor extent in order to decrease the amount of material to be heated in heater 21 (or to decrease the exit temperature of the heater 21), it is more advantageous to eliminate all preheating of the feed, as illustrated and described. It has also been found in the practice of the described method, that whereas a partial pressure of more than 10 atmospheres of hydrogen is necessary in the heater 21, there is no appreciable advantage in using hydrogen partial pressures above about 25 atmospheres. The decobalting reactor 13 is, therefore, preferably operated at a pressure substantially lower than that in the carbonylation reactor 5, and preferably in the order of 25 to 50 atmospheres. It is to be understood, however, that the invention should not be limited to the preferred embodiment used to illustrate and explain the various features of the method. It is possible, for instance, to combine the decobalting reactor 13 and the heater 21 in a single vessel properly partitioned to give the same result. This and similar obvious variations of the described preferred embodiment are considered to be within the bounds of the more fundamental aspects of the described invention.

*Example*

In the production of $C_7$–$C_9$ alcohols by the carbonylation of a $C_6$–$C_8$ olefinic hydrocarbon fraction, 4% by weight of a cobalt catalyst consisting of 30% cobalt deposited in 70% kieselguhr was used under conventional conditions. The product from the carbonylation zone contained 65% by weight aldehydes, 7% by weight alcohols and 0.45% by weight of dissolved cobalt. After cooling to 20° C. and separating the excess gas, the liquid product containing the suspended catalyst and dissolved cobalt was passed at a rate of 20 liters per hour together with 3 m.³ hydrogen per hour into the bottom of a decobalting tower. At the same time 60 liters per hour of decobalted product was withdrawn from the top of the decobalting tower. A side stream of 40 liters per hour of the material, together with 1 m.³ hydrogen per hour, was heated in a preheater to a temperature of 300° C. while maintaining the pressure of 50 atm. The remaining 20 liters per hour of withdrawn material was withdrawn as decobalted product. During 500 hours of operation 99-100% of the dissolved cobalt was decomposed without deposition of undesirable cobalt deposits, without deactivation of the catalyst, and without appreciable formation of side reaction products.

In contrast to this operation, when it was attempted to heat the cobalt-containing carbonylation product to the decobalting temperature by the use of various coils, heaters and the like, the operation had to be stopped frequently to recover deposited cobalt from the heating surfaces.

Also in contrast with this operation, when it was attempted to operate in the described manner, except that hydrogen was omitted in the preheater, the catalyst was substantially completely deactivated, even when the temperature was raised only to 150° C. When a partial pressure of hydrogen of about 5 atm. was applied the catalyst lost all but a small amount of its activity.

We claim as our invention:

1. In a process for the synthesis of an oxygenated compound through carbonylation in the presence of a cobalt catalyst, wherein liquid product of the carbonylation is cooled to a temperature below 50° C. and the cooled liquid product containing cobalt in solution is subsequently subjected to treatment with hydrogen at a temperature of about 150° C. to 200° C. in a so-called decobalting zone to convert said cobalt in solution into insoluble form, the improvement which comprises heating a portion of the liquid effluent of said decobalting zone substantially devoid of dissolved cobalt and containing cobalt in suspension with hydrogen under a partial pressure of more than 10 atmospheres to a temperature between 200° C. and about 350° C. but below that causing appreciable cracking, commingling the thus-heated portion of said effluent with the aforesaid cooled liquid product containing cobalt in solution and with hydrogen in said decobalting zone, the amount of said heated portion being adjusted to maintain the temperature in said decobalting zone between 150° C. and 200° C. whereby the said cooled liquid product of the carbonylation containing cobalt in solution is heated to the temperature of said decobalting zone without contact with a hot wall surface.

2. In a process for the synthesis of an oxygenated compound through carbonylation in the presence of a cobalt catalyst wherein cobalt in solution in cooled liquid carbonylation product is converted to insoluble form by treatment of the said product in a so-called decobalting zone with a hydrogen-containing gas at a temperature of the order of 150° C. to 200° C., the method of heating the cooled liquid carbonylation product containing dissolved cobalt up to the temperature prevailing in said decobalting zone, which method consists in commingling said cooled liquid carbonylation product with a heated portion of the liquid effluent of said decobalting zone containing the cobalt substantially wholly in insoluble form which portion has been heated while under a partial pressure of hydrogen of more than 10 atmospheres to a temperature between 200° C. and 350° C. but below that causing appreciable cracking.

3. Process according to claim 2 further characterized in that the cooled liquid carbonylation product containing dissolved cobalt and the heated portion of the liquid effluent of the decobalting zone are commingled in the decobalting zone.

JOHANNES C. VLUGTER.
ALOYSIUS I. M. KEULEMANS.
MARIUS 'T HART.

REFERENCES CITED

The following references are of record in the file of this patent:

UNITED STATES PATENTS

| Number | Name | Date |
|---|---|---|
| 2,095,338 | Luther et al. | Oct. 12, 1937 |
| 2,301,044 | Heard et al. | Nov. 3, 1942 |
| 2,345,487 | Liedholm | Mar. 28, 1944 |
| 2,385,216 | Maranick et al. | Sept. 18, 1945 |

FOREIGN PATENTS

| Number | Country | Date |
|---|---|---|
| 539,252 | Great Britain | Sept. 2, 1941 |

OTHER REFERENCES

Fiat Final Report No. 1000, PB-81383, Dec. 26, 1947, pages 13, 16, and 17.